United States Patent Office 3,025,300
Patented Mar. 13, 1962

3,025,300
NEW PHTHALIMIDES AND METHODS FOR
THEIR PREPARATION
Charles Ferdinand Huebner, Chatham, N.J., assignor to
Ciba Pharmaceutical Products, Inc., Summit, N.J., a
corporation of New Jersey
No Drawing. Filed Dec. 14, 1955, Ser. No. 552,992
6 Claims. (Cl. 260—294)

This is a continuation-in-part of my copending applications, Serial No. 448,123, filed August 5, 1954, now abandoned, and Serial No. 529,341, filed August 18, 1955.

This invention relates to a new series of chemical compounds. More particularly, this invention is concerned with new N-(2-disubstituted-aminoalkyl)-1,2,3,4-tetrachlorophthalimides.

The compounds of this application may be represented by the formula:

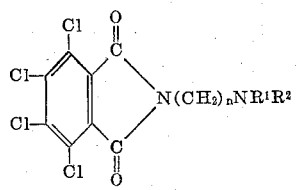

wherein $R^1$ and $R^2$ are members selected from the group consisting of lower alkyl radicals and when taken together, comprise the alkylene and oxaalkylene radicals containing from 4 to 5 carbon atoms, and $n$ is a whole number from 2 to 3.

In my copending application Serial No. 448, 123, I have disclosed certain quaternary N-(substituted-aminoalkyl)-tetrachloroisoindolines and methods for their manufacture. These compounds may be represented by the formula:

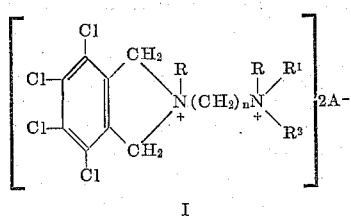

I wherein R, $R^1$ and $R^2$ are lower alkyl radicals or $R^1$—N—$R^2$ taken together is a heterocycloaliphatic radical containing from 4 to 5 carbon atoms such as 1-pyrrolidinyl, piperidino or morpholino, A is a therapeutically useful anion from acids such as hydrochloric, hydrobromic, hydriodic, methanesulfonic, acetic, citric, tartaric, p-toluenesulfonic or from esters such as dialkyl sulfates, i.e. dimethyl sulfate and the like, and $n$ is 2 or 3.

The quaternary N-(substituted-aminoalkyl)-tetrachloroisoindolines may be prepared by treating a 2-(disubstituted-aminoalkyl)-4,5,6,7-tetrachloroisoindoline with a quaternizing agent capable of introducing a lower alkyl residue, especially reactive esters of lower alkanols, such as lower alkyl halides, lower alkyl p-toluenesulfonates, or di(lower)alkyl sulfates. Quaternary salts of other acids such as sulfuric, acetic, tartaric, citric, benzoic and the like are produced, for example, from the iodides by treatment of the quaternary iodide in alcoholic solution with the silver salt of the desired acid. Alternatively, the free quaternary hydroxide may be formed by treating the quaternary halide salt with silver oxide in aqueous or alcoholic solution followed by neutralization with the desired acid. The quaternary iodides may be converted to the chlorides by refluxing with an excess of methanolic hydrogen chloride, the iodide anion being removed as methyl iodide.

The 2-(disubstituted-aminoalkyl) - 4,5,6,7 - tetrachloroisoindolines are prepared conveniently by heating a mixture of tetrachlorophthalic anhydride with an excess of substituted-aminoalkylamine, and hydrogenating the phthalimide compound thus produced. The series of reactions is illustrated as follows:

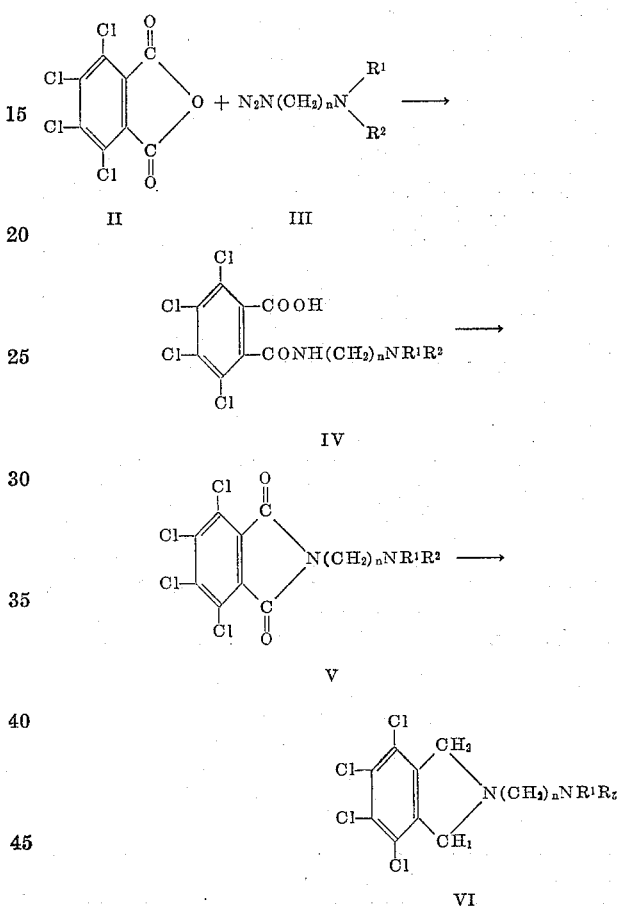

wherein $R^1$, $R^2$, $R^1NR^2$ and $n$ have the meanings as aforesaid.

The tetrachlorophthalic anhydride II and excess substituted-aminoalkylamine III are preferably heated either with or without added solvent such as acetic acid at an elevated temperature of from about 100° to about 200° for from ½ to 3 hours, during which time the amide IV is first formed and on further heating is converted to the imide V. The imide thus formed is hydrogenated with an agent such as lithium aluminum hydride, or by catalytic hydrogenation to the isoindoline VI.

Alternatively, the 2-(disubstituted aminoalkyl)-4,5,6,7-tetrachloroisoindolines VI are prepared by treating tetrachlorophthalimide or its potassium salt with ethylene or propylene dihalide such as the dibromide or dichloride to form the corresponding N-(halogenalkyl)-tetrachlorophthalimide which is treated with the desired secondary amine to form N-(substituted-aminoalkyl)-tetrachlorophthalimide which is then reduced as described above to the 4,5,6,7 - tetrachloro - 2-(substituted-aminoalkyl)-isoindoline VI.

Alternatively, the isoindolines VI may be formed by treating potassium 1,2,3,4-tetrachlorophthalimide in dimethyl formamide solution with a substituted-aminoalkyl halide followed by reduction according to the steps:

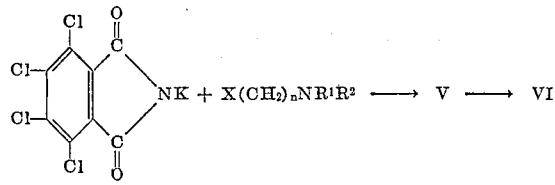

The quaternary N-(substituted-aminoalkyl)-tetrachloroisoindolines described herein are useful as ganglionic blocking agents and may be administered either parenterally or orally and are of particular interest for oral administration. For the purpose of administration, the compounds may be made up in the form of tablets, ampoules and other dosage forms. Any suitable carrier or vehicle may be employed, e.g., water, gelatin, starch, magnesium stearate, talc, vegetable oils, benzyl alcohol, gums, polyalkylene glycols, petroleum jelly, cholesterol or other known carrier substances for medicaments.

Substitution of four nuclear chlorine atoms in 2-diethylaminoethyl-isoindoline dimethiodide results in an unexpected and remarkable enhancement of the ganglionic blocking activity. Thus, the activity of 2-dimethylaminoethyl-4,5,6,7-tetrachloroisoindoline dimethiodide is eighteen fold greater than that of 2-diethylaminoethyl-isoindoline dimethiodide. The quaternized 2-di(lower)alkyl aminoalkyl-4,5,6,7-tetrachloroisoindolines are more active than the quaternized 2-piperidinoethyl-4,5,6,7-tetrachloroisoindolines. The methyl quaternary salts of 4,5,6,7-tetrachloro-2-(2-dimethylaminoethyl)-isoindoline exhibit especially marked ganglionic blocking properties.

The activity of the quaternized tetrachloroisoindolines expressed as the ratio of the dose required to give 50 percent inhibition of the nictitating membrane in the cat as compared to the known 2-diethylaminoethyl-isoindoline dimethiodide is summarized below, the tests being carried out according to the procedure of Acheson and Pereia, Exp. Pharm. and Therap. 87:273 (1946).

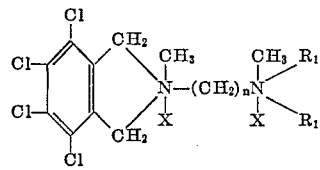

| $R_1$ | $R_1$-N-$R_1$ | n | X | Activity |
|---|---|---|---|---|
| $CH_3$ | | 2 | I | 55 |
| $CH_3$ | | 2 | Cl | 111 |
| $C_2H_5$ | | 2 | I | 18 |
| | Piperidino | 2 | I | 11 |
| $CH_3$ | | 3 | Cl | 76 |
| $CH_3$ | | 3 | I | 55 |
| $CH_3$ | | 3 | $OSO_3CH_3$ | 50 |
| $C_2H_5$ | | 3 | I | 29 |
| | 1-pyrrolidinyl | 3 | I | 50 |
| 2-diethylaminoethyl-isoindoline dimethiodide | | | | 1 |

The invention extends also to 2-(disubstituted aminoalkyl)-4,5,6,7-tetrachloroisoindolines and their acid addition salts which serve as intermediates for the preparation of the quaternary derivatives.

The invention is described in greater detail in the examples that follow which are presented by way of illustration and not of limitation. Parts by weight bear the same relation to parts by volume as do grams to milliliters. Temperatures are uncorrected and expressed in degrees centigrade.

*Example 1*

50 parts by weight of 1,2,3,4-tetrachlorophthalic anhydride is added with stirring and cooling to 30 parts by volume of dimethylaminoethyl amine. The mixture is heated at 170° for 45 minutes and the oily residue then dissolved in 200 parts by volume of hot ethanol. On cooling, N-(dimethylaminoethyl)-1,2,3,4-tetrachlorophthalimide separates. It crystallizes from ethanol and melts at 184–186°.

6 parts by weight of N-(dimethylaminoethyl)-1,2,3,4-tetrachlorophthalimide is extracted continuously with 300 parts by volume of dry ether in which have been dissolved 3.1 parts by weight of lithium aluminum hydride. After 48 hours the excess lithium aluminum hydride is destroyed by cautious addition of 9 parts by volume of ethyl acetate while stirring. There is then added in succession with stirring 3 parts by volume of water, 6 parts by volume of 15 percent aqueous sodium hydroxide and 9 parts by volume of water. The granular precipitate of lithium and aluminum salts are filtered and washed with ether. The ether is distilled off, yielding the crude, oily 4,5,6,7-tetrachloro-2-(2-dimethylaminoethyl)-isoindoline. The above base is dissolved in 25 parts by volume of 90 percent ethanol and refluxed 2 hours with 6 parts by volume of methyl iodide. 4,5,6,7-tetrachloro-2-(2-dimethylaminoethyl)-isoindoline dimethiodide separates during the reaction. It is collected by filtration and recrystallized from a mixture of ethanol and water; M.P. 244–246°.

4,5,6,7-tetrachloro-2-(2-dimethylaminoethyl)-isoindoline dimethochloride is prepared by shaking an aqueous solution of the dimethiodide with an excess of freshly prepared silver chloride and evaporating to dryness the aqueous solution after removal of the silver salts. 4,5,6,7-tetrachloro-2-(2-dimethylaminoethyl)-isoindoline dimethochloride is recrystallized from ethanol-ethylacetate; M.P. 276–280°.

3.6 parts by weight of 4,5,6,7-tetrachloro-2-(dimethylaminoethyl)-isoindoline is refluxed in 50 parts by volume of ethanol with 3.5 parts by weight of dimethyl sulfate for 2 hours. On cooling, the methosulfate crystallized. Recrystallization from ethanol-water yielded 4,5,6,7-tetrachloro-2-(dimethylaminoethyl)-isoindoline dimethosulfate, melts at 224–227°.

*Example 2*

3.9 parts by weight of dimethylaminoethylamine is added with stirring to a suspension of 10 parts by weight of 1,2,3,4-tetrachlorophthalic anhydride in 35 parts by volume of acetic acid. Heat is evolved as the anhydride dissolves. After the reaction mixture has been refluxed 3 hours, most of the acetic acid is distilled off. While the residue is stirred with 50 parts by volume of water, concentrated ammonia is added until the mixture becomes alkaline. The N-(dimethylaminoethyl)-1,2,3,4-tetrachlorophthalimide is filtered and dried. It is pure enough for further reaction without recrystallization.

6 parts by weight of N-(dimethylaminoethyl)-1,2,3,4-tetrachlorophthalimide is pulverized and added to a well-stirred solution of 3.1 parts by weight of lithium aluminum hydride in ether in 300 parts by volume of dry ether. The mixture is stirred for 24 hours after which the reaction mixture is worked up as described in Example 1.

*Example 3*

Diethylaminoethylamine is reacted with 1,2,3,4-tetrachlorophthalic anhydride as described in Example 1 to yield N-(diethylaminoethyl)-1,2,3,4-tetrachlorophthalimide; M.P. 121–122°. This is reduced by the same procedure as in Example 1 to 4,5,6,7-tetrachloro-2-(2-diethylaminoethyl)-isoindoline. The latter is quaternized with methyliodide to yield 4,5,6,7-tetrachloro-2-(diethylaminoethyl)-isoindoline dimethiodide, which after recrystallization from a methanol-water mixture melts at 243–246°.

5 parts by weight of 4,5,6,7-tetrachloro-2-(diethylaminoethyl)-isoindoline dimethiodide is refluxed for 30 minutes with 30 parts by volume of 5 normal methanolic hydrogen chloride. The mixture is concentrated to dryness and recrystallized from ethanol-ethyl acetate to yield 4,5,6,7-tetrachloro-2-(diethylaminoethyl)-isoindoline dimethochloride; M.P. 202–207°.

Other salts may be prepared by converting the iodide salt to the quaternary base and neutralizing with the desired acid. For example, the tartrate salt may be made by suspending 2 parts by weight of 4,5,6,7-tetrachloro-2-(2-diethylaminoethyl)-isoindoline dimethiodide in 20 parts by volume of water and stirring with 5 parts by weight of moist silver oxide for 24 hours. The silver salts are removed, a 20 percent aqueous tartaric acid solution is added until the basic solution becomes neutral to phenolphthalein and the aqueous solution evaporated to dryness in vacuo. The residue is dissolved in a small amount of hot absolute ethanol and ethyl acetate added to turbidity. Cooling gives fine needles of the highly water soluble 4,5,6,7-tetrachloro - 2 - (2-diethylaminoethyl)-isoindoline dimethotartrate dihydrate, M.P. 200–202°.

Example 4

2 parts by weight of 4,5,6,7-tetrachloro-2-(2-diethylaminoethyl)-isoindoline is refluxed for 4 hours with 1.57 parts by volume of dimethyl sulfate in 10 parts by volume of ethanol. Ethyl acetate is added to precipitate a syrup which slowly crystallizes on standing at 5°. The solid is recrystalized from ethanol and melts at 200–202°. The product is 4,5,6,7-tetrachloro - 2 - (2-diethylaminoethyl)-isoindoline dimethosulfate.

Example 5

10 parts by weight of potassium 1,2,3,4-tetrachlorophthalimide is dissolved in 50 parts by volume of dimethylformamide at 80°. 10 parts by volume of N-(2-chloroethyl)-piperidine is added slowly. After 15 minutes at this temperature an additional 5 parts by volume of N-(2-chloroethyl)-piperidine is added and heating continued for 30 minutes. The reaction mixture is poured into water to yield a gummy material which is crystallized from ethanol to give 1,2,3,4-tetrachloro-N-piperidinoethylphthalimide; M.P. 150–152°. This is reduced with lithium aluminum hydride and the resulting 4,5,6,7-tetrachloro - 2 - (2 - piperidinoethyl)-isoindoline reacted with methyl iodide as described in Example 1 to yield 4,5,6,7-tetrachloro - 2 - (2 - piperidinoethyl)-isoindoline dimethiodide which melts at 239–242° after recrystallization from ethanol.

Example 6

To a stirred solution of 4.5 parts by weight of 3-dimethylaminopropylamine in 100 parts by volume of benzene is added 10 parts by weight of tetrachlorophthalic anhydride. The intermediate phthalimic acid (M.P. 195–6°) soon comes out of solution. It is not isolated but redissolves as continued refluxing causes lactamization to the phthalimide. After 12 hours the benzene is evaporated, leaving a residue of N-(3-dimethylaminopropyl)-1,2,3,4-tetrachlorophthalimide which on recrystallization from ethanol melts at 125–127°. The steps of reduction and quaternization of the resulting isoindoline is carried out as described in Example 1 to yield 4,5,6,7-tetrachloro-2 - (3 - dimethylaminopropyl) - isoindoline dimethiodide which after recrystallization from 90 percent ethanol melts at 228–230° (dec.).

Conversion to the corresponding dimethochloride is effected by shaking with silver chloride as described in Example 1. The dimethochloride is obtained also by direct quaternization of the isoindoline by bubbling methylchloride into a boiling methylethylketone solution of the isoindoline. 4,5,6,7-tetrachloro - 2 - (3 - dimethylaminopropyl) dimethochloride separates during the reaction and after recrystallization from ethanol-ethylacetate melts at 252–254° (dec.).

1 part by weight of 4,5,6,7-tetrachloro-2-(3-dimethylaminopropyl)-isoindoline and 1.1 parts by volume of dimethylsulfate in 15 parts by volume of ethanol is refluxed for 2 hours. The ethanol is removed in vacuo and addition of ethyl acetate causes separation of the crystalline quaternary salts. It is recrystallized from an ethanol-ethyl acetate mixture to yield the purified 4,5,6,7-tetrachloro - 2 - (3-dimethylaminopropyl)-isoindoline dimethosulate; M.P. 165–8° (dec.).

Example 7

11.5 parts by weight of 3-diethylaminopropylamine is reacted with 20 parts by weight of tetrachlorophthalic anhydride in benzene as described in Example 6. The intermediary phthalimide is reduced with lithium aluminum hydride and the resulting product quaternized with excess methyliodide as described in Example 1. The quaternary salt thus obtained is recrystallized from ethanol-water to yield 4,5,6,7-tetrachloro - 2 - (3 - diethylaminopropyl)-isoindoline dimethiodide; M.P. 215–220° (dec.).

Example 8

To a stirred suspension of 36 parts by weight of tetrachlorophthalic anhydride and 100 parts by volume of acetic acid is added 14.3 parts by weight of 1-(3-aminopropyl)-pyrrolidine. The mixture is refluxed for 3 hours, cooled and a small amount of insoluble material removed by filtration. The filtrate is reduced in volume to 1 quarter by distillation, 100 parts by volume of water are added and the mixture made basic with ammonia. The material which separates is filtered off and recrystalized from an ethanol-acetone mixture to yield purified N-3-(1-pyrrolidinyl)-propyl - 1,2,3,4 - tetrachlorophthalimide; M.P. 157–158°. Reduction of this substance with lithium aluminum hydride as described in Example 1 gives 4,5,6,7-tetrachloro - 2 - 3 - (1 - pyrrolidinyl)-propyl-isoindoline which melts at 96–98° after recrystallization from ethanol. On treatment with methyl iodide, as described in Example 1, and recrystallization of the resulting quaternary compound from ethanol-water, 4,5,6,7-tetrachloro-2-3-(1-pyrrolidinyl) - propyl-isoindoline dimethiodide is obtained; M.P. 207–210°.

Example 9

10.5 parts by weight of 1-(2'-aminoethyl)-morpholine are added dropwise with stirring to a solution of 20 parts by weight of 3,4,5,6-tetrachlorophthalic anhydride in 100 parts by volume of acetic acid. The reaction mixture is refluxed for 2 hours, then ¾ of the acetic acid is removed in vacuo. The residue is diluted with water and made basic with ammonia, precipitating the imide. The imide is filtered and after recrystallization from ethanol, N-(2'-morpholinoethyl)-3,4,5,6-tetrachlorophthalimide melts at 165–167°.

20 parts by weight of N-(2'-morpholinoethyl)-3,4,5,6-tetrachlorophthalimide are slurried with anhydrous ether and added dropwise to a suspension of 5.8 parts by weight of lithium aluminum hydride in 250 parts by volume of anhydrous ether. After refluxing for 18 hours, the reaction mixture is decomposed with 75 parts by volume of ethyl acetate followed by 5.8 parts by volume of water, 11.6 parts by volume of 15 percent sodium hydroxide and finally 17.4 parts by volume of water. The reaction mixture is then diluted with ether and filtered. Evaporation of the ether yields a semi-solid residue. The thus obtained 4,5,6,7-tetrachloro-2-(2' - morpholinoethyl)-isoindoline is purified by recrystallization from ethanol-water, M.P. 110–112°.

The corresponding dimethiodide is prepared by refluxing a solution of 4 parts by weight of 4,5,6,7-tetrachloro-2-(2'-morpholinoethyl)-isoindoline in 10 parts by volume of dimethyl formamide with 15 parts by volume of methyl iodide for 4 hours.

Some solid material is filtered off and ethyl acetate added to the filtrate. The resulting gummy material is crystallized by rubbing with ethyl acetate. Purification of the thus obtained 4,5,6,7-tetrachloro-2-(2'-morpholinoethyl)-isoindoline dimethiodide is achieved by recrystallization from aqueous ethanol-ethyl acetate; M.P. 189–192°.

What is claimed is:
1. A compound of the formula:

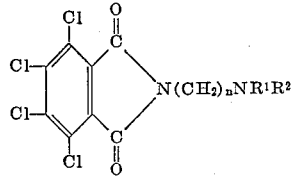

wherein $R^1$ and $R^2$ are members selected from the group consisting of lower alkyl radicals and when taken together, comprise the alkylene and oxaalkylene radicals containing from 4 to 5 carbon atoms, and $n$ is a whole number from 2 to 3.

2. N - (2 - dimethylaminoethyl) - 1,2,3,4-tetrachlorophthalimide.

3. N-(2-diethylaminoethyl)-1,2,3,4 - tetrachlorophthalimide.

4. N-(2-piperidinoethyl) - 1,2,3,4 - tetrachlorophthalimide.

5. N-(3-dimethylaminopropyl) - 1,2,3,4 - tetrachlorophthalimide.

6. N - (3 - diethylaminopropyl) - 1,2,3,4 - tetrachlorophthalimide.

References Cited in the file of this patent
UNITED STATES PATENTS
2,443,888     Bohrer _____ June 22, 1948

OTHER REFERENCES

Sakurai: C.A., vol. 26, July–September 1932, page 4542³.

Moore and Rapala: J.A.C.S., 68: 1657 (1946).

Uffer et al.: C.A., vol. 43, January–March, 1949, page 121h.

UNITED STATES PATENT OFFICE
CERTIFICATE OF CORRECTION

Patent No. 3,025,300                          March 13, 1962

Charles Ferdinand Huebner

It is hereby certified that error appears in the above numbered patent requiring correction and that the said Letters Patent should read as corrected below.

Column 2, lines 10 to 20, formula III, should appear as shown below instead of as in the patent:

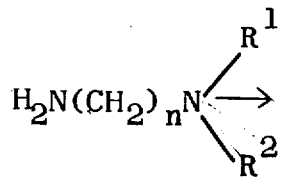

same column, lines 40 to 45, formula VI, should appear as shown below instead of as in the patent:

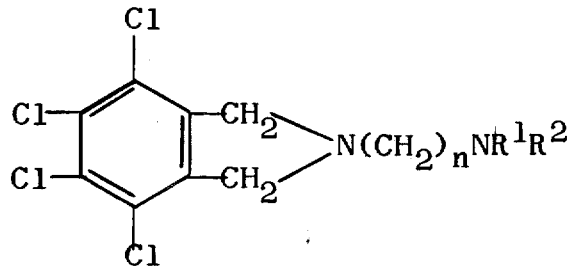

Signed and sealed this 17th day of September 1963.

(SEAL)
Attest:

ERNEST W. SWIDER                        DAVID L. LADD

Attesting Officer                           Commissioner of Patents